(12) United States Patent
Hayashi et al.

(10) Patent No.: US 11,848,622 B2
(45) Date of Patent: Dec. 19, 2023

(54) ELECTRONIC DEVICE AND POWER CONVERTER

(71) Applicant: KABUSHIKI KAISHA TOSHIBA, Tokyo (JP)

(72) Inventors: Yusuke Hayashi, Yokohama Kanagawa (JP); Satoshi Yoshida, Tokyo (JP); Kazuto Takao, Tsukuba Ibaraki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 17/468,378

(22) Filed: Sep. 7, 2021

(65) Prior Publication Data

US 2022/0115961 A1    Apr. 14, 2022

(30) Foreign Application Priority Data

Oct. 8, 2020   (JP) .................. 2020-170677

(51) Int. Cl.
*H02M 7/537*   (2006.01)
*H02M 7/00*    (2006.01)

(52) U.S. Cl.
CPC ........... *H02M 7/537* (2013.01); *H02M 7/003* (2013.01)

(58) Field of Classification Search
CPC .............................. H02M 7/003; H02M 7/537
USPC .......................................................... 363/16
See application file for complete search history.

(56) References Cited

U.S. PATENT DOCUMENTS

| | | | |
|---|---|---|---|
| 5,583,424 A | 12/1996 | Sato et al. | |
| 7,864,549 B1 * | 1/2011 | Wittenbreder, Jr. | ........................ H02M 3/33576 363/21.06 |
| 8,076,696 B2 | 12/2011 | Beaupre et al. | |
| 8,723,306 B2 | 5/2014 | Tsuyuno et al. | |
| 8,773,204 B2 | 7/2014 | Cabanillas et al. | |
| 9,000,553 B2 | 4/2015 | Tokuyama et al. | |
| 10,144,435 B2 | 12/2018 | Sogo et al. | |
| 10,283,475 B2 * | 5/2019 | Ward | ................... H01L 25/0655 |
| 2010/0087036 A1 * | 4/2010 | Lotfi | ................. H01L 23/49589 438/122 |
| 2012/0081202 A1 | 4/2012 | Nanayakkara et al. | |
| 2021/0119538 A1 * | 4/2021 | Leong | ................... H02M 3/156 |

FOREIGN PATENT DOCUMENTS

| | | |
|---|---|---|
| EP | 1 887 839 A2 | 2/2008 |
| EP | 2 323 245 A1 | 5/2011 |
| EP | 3 267 566 A1 | 1/2018 |
| EP | 2 521 175 B1 | 3/2020 |
| JP | 2002-176769 A | 6/2002 |
| JP | 2011-97053 A | 5/2011 |
| JP | 2012-235128 A | 11/2012 |
| JP | 2015-510359 A | 4/2015 |

(Continued)

OTHER PUBLICATIONS

K. Nakatsu, et. al., "A Wiring Implementation Technology to Reduce the Inductance of the Power Module," J. of Japan Inst. of Electronics Packaging, vol. 18, No. 4, pp. 270-278 (2015).

*Primary Examiner* — Yemane Mehari
(74) *Attorney, Agent, or Firm* — Finnegan, Henderson, Farabow, Garrett & Dunner, LLP

(57) ABSTRACT

An electronic device has a primary loop circuit that includes a main circuit causing a current to flow in a loop shape; and a secondary loop circuit that is disposed to face the primary loop circuit at a predetermined distance, and causes an induced current generated by a magnetic field generated in the primary loop circuit to flow in a loop shape.

18 Claims, 22 Drawing Sheets

(56) References Cited

FOREIGN PATENT DOCUMENTS

| | | |
|---|---|---|
| JP | 2016-9697 A | 1/2016 |
| JP | 2018-34776 A | 3/2018 |
| WO | WO 2010/129850 A2 | 11/2010 |
| WO | WO 2011/125780 A1 | 10/2011 |
| WO | WO 2012/014843 A1 | 2/2012 |

* cited by examiner

ELECTRONIC DEVICE AND POWER CONVERTER

CROSS REFERENCE TO RELATED APPLICATIONS

This application is based upon and claims the benefit of priority from the prior Japanese Patent Application No. 2020-170677, filed on Oct. 8, 2020, the entire contents of which are incorporated herein by reference.

FIELD

One aspect of the present invention relates to an electronic device and a power converter.

BACKGROUND

In a power converter, operations of a high-side semiconductor element and a low-side semiconductor element are periodically switched to periodically change a direction of a current flowing in the power converter. When the operations of the high-side semiconductor element and the low-side semiconductor element are switched, there is a possibility that a surge or ringing occurs in the power converter. When the surge or the ringing occurs in the power converter, devices around the power converter are affected by electromagnetic noise due to the surge or the ringing.

As a quick measure to prevent the electromagnetic noise, it is conceivable to provide a shield plate around the power converter. However, when a place in which the shield plate is disposed is not appropriate, the electromagnetic noise cannot be effectively suppressed. Furthermore, it is conceivable to cover the entire power converter with the shield plate, but cost is increased, and miniaturization becomes difficult.

BRIEF DESCRIPTION OF THE DRAWINGS

FIG. 8B is a graph of a drain current waveform of a low-side semiconductor element when the low-side semiconductor element is turned on;

DETAILED DESCRIPTION

According to one embodiment, an electronic device has a primary loop circuit that includes a main circuit causing a current to flow in a loop shape; and a secondary loop circuit that is disposed to face the primary loop circuit at a predetermined distance, and causes an induced current generated by a magnetic field generated in the primary loop circuit to flow in a loop shape.

Hereinafter, embodiments of an electronic device and a power converter will be described with reference to the drawings. Main constituent parts of the electronic device and the power converter will be mainly described below, but the electronic device and the power converter may have constituent parts and functions not illustrated or described. The following description does not exclude the constituent parts and the functions not illustrated or described.

Figure 1:
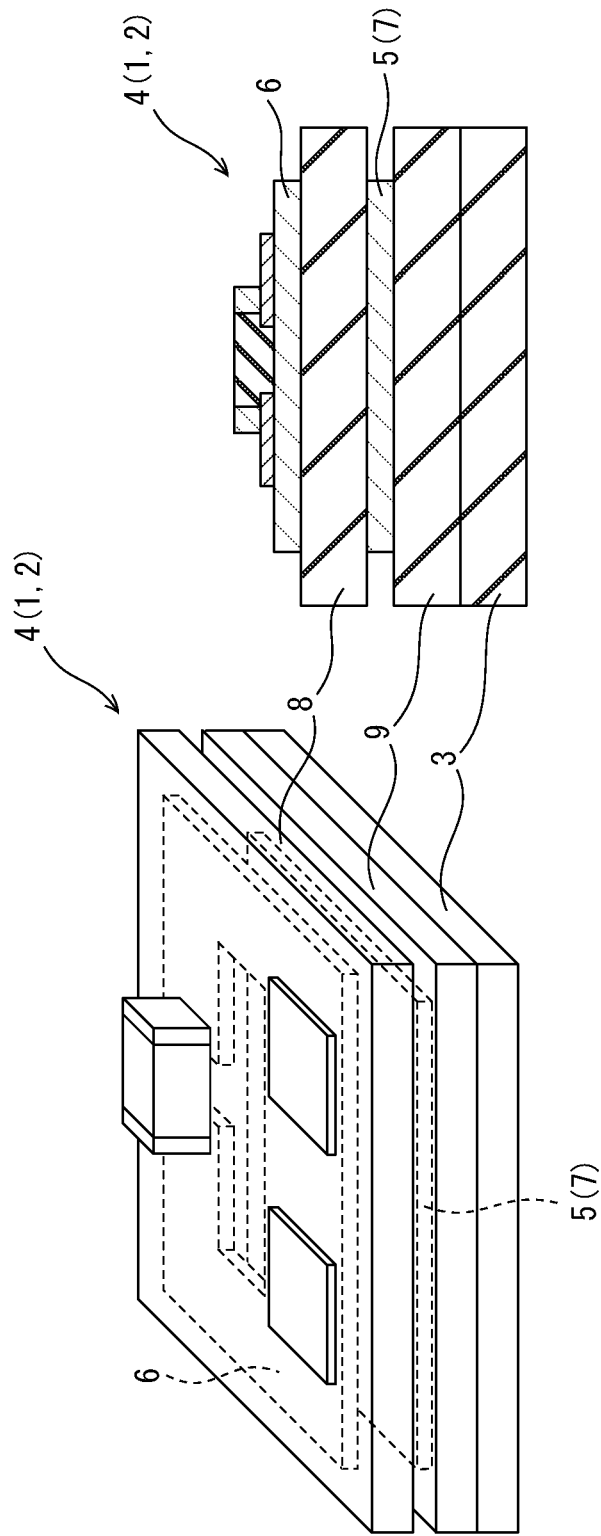
FIG. 1 is a schematic perspective view and a cross-sectional view of an electronic device including a power converter according to an embodiment.

FIG. 1 shows a schematic perspective view and a cross-sectional view of an electronic device 2 including a power converter 1 according to an embodiment. The power converter 1 is a device (including a switch) that converts power. For example, the electronic device 2 includes the power converter 1. The electronic device 2 of FIG. 1 is configured by disposing the power converter 1 on a base substrate 3. The base substrate 3 is, for example, an insulating substrate, and a printed wiring board or the like may be the base substrate 3. The electronic device 2 of FIG. 1 includes a primary loop circuit 4 and a secondary loop circuit 5.

The primary loop circuit 4 includes a main circuit that causes a current to flow in a loop shape. The main circuit is a circuit configuring the power converter 1. The main circuit has a current path through which a current flows in a loop shape. A specific shape of the current path is arbitrary, and may be a meandering shape. A specific circuit configuration of the main circuit will be described later. The primary loop circuit 4 is not necessarily a circuit configuring the power converter 1. The primary loop circuit 4 may be any circuit having a current path through which a current flows in a loop shape.

The secondary loop circuit 5 is disposed to face the primary loop circuit 4 at a predetermined distance, and causes an induced current to flow in a loop shape. The secondary loop circuit 5 does not include an active element such as a transistor and a diode, but includes a passive element. The secondary loop circuit 5 causes an induced current generated by an influence of a magnetic field caused by the current flowing in the primary loop circuit 4 to flow. The secondary loop circuit 5 desirably has a shape and size corresponding to the shape and the size of the primary loop circuit 4. More desirably, the primary loop circuit 4 has substantially the same shape and size as those of the secondary loop circuit 5. The secondary loop circuit 5 configures a loop antenna receiving power from the primary loop circuit 4.

The predetermined distance is a distance within a range in which the induced current generated by a magnetic field generated in the main circuit flows in the secondary loop circuit 5. That is, the predetermined distance is a distance within a range in which the secondary loop circuit 5 is magnetically coupled to the primary loop circuit 4.

As illustrated in FIG. 1, a first layer 6 in which the primary loop circuit 4 is disposed and a second layer 7 in which the secondary loop circuit 5 is disposed are provided on the base substrate 3. The second layer 7 is disposed above or below the first layer 6 at a predetermined distance. The first layer 6 and the second layer 7 are disposed on a front surface, a back surface, or an inner layer surface of the base substrate 3. When the first layer 6 and the second layer 7 are viewed in a plan view in a normal direction of the first layer 6 and the second layer 7, the primary loop circuit 4 and at least a part of the secondary loop circuit 5 are disposed so as to vertically overlap each other.

In the example of FIG. 1, the first layer 6 in which the primary loop circuit 4 is disposed is disposed on a first insulation layer 8, the second layer 7 in which the secondary loop circuit 5 is disposed is disposed on a second insulation layer 9 below the first insulation layer 8, and the second insulation layer 9 is disposed on the base substrate 3. A stacked structure of the electronic device 2 of FIG. 1 is an example, and various modified examples can be considered. For example, a stacking order of the first layer 6 and the second layer 7 may be reversed. Alternatively, the first layer 6 may be disposed on a first main surface of the base substrate 3, and the second layer 7 may be disposed on a second main surface on an opposite side to the first main surface of the base substrate 3.

Figure 2A:
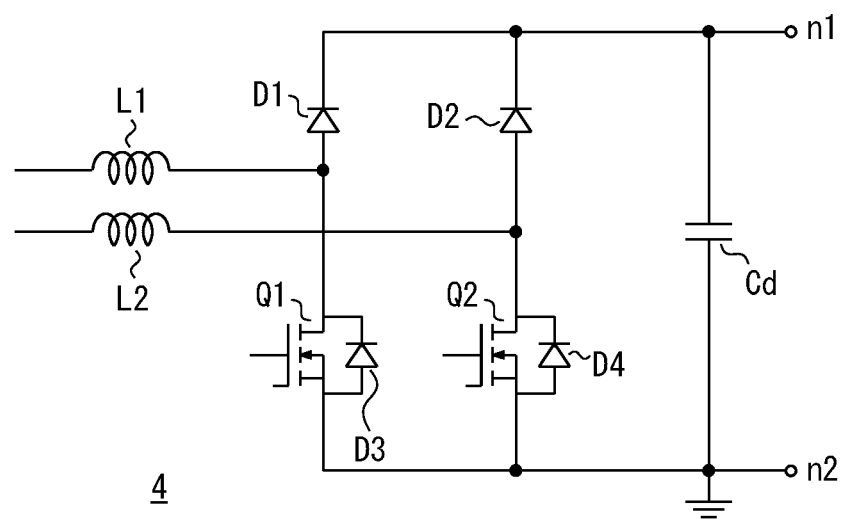
FIG. 2A is a circuit diagram illustrating an example of a primary loop circuit disposed in a first layer.

FIG. 2A is a circuit diagram illustrating an example of the primary loop circuit 4 disposed in the first layer 6. FIG. 2A is a circuit diagram of the power converter 1. The power converter 1 of FIG. 2A includes a high-side semiconductor element D1 and a low-side semiconductor element Q1 which are connected in series between a first node n1 and a second node n2, a high-side semiconductor element D2 and a low-side semiconductor element Q2 which are also connected in series between the first node n1 and the second node n2, a capacitor Cd connected between the first node n1 and the second node n2, a first inductor L1, and a second inductor L2. Each of the high-side semiconductor elements D1 and D2, and the low-side semiconductor elements Q1 and Q2 is a transistor or a diode. FIG. 2A illustrates an example in which the high-side semiconductor elements D1 and D2 are diodes, and the low-side semiconductor elements Q1 and Q2 are transistors.

Figure 2B:
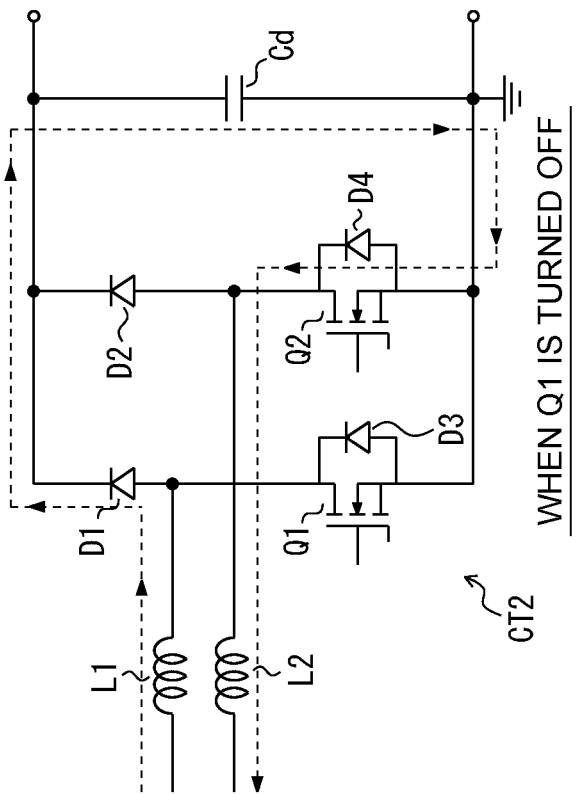
FIG. 2B is a diagram illustrating directions of currents flowing in a power converter in a case where a low-side semiconductor element is turned on and in a case where the low-side semiconductor element is turned off by arrow lines.
Figure 2B:
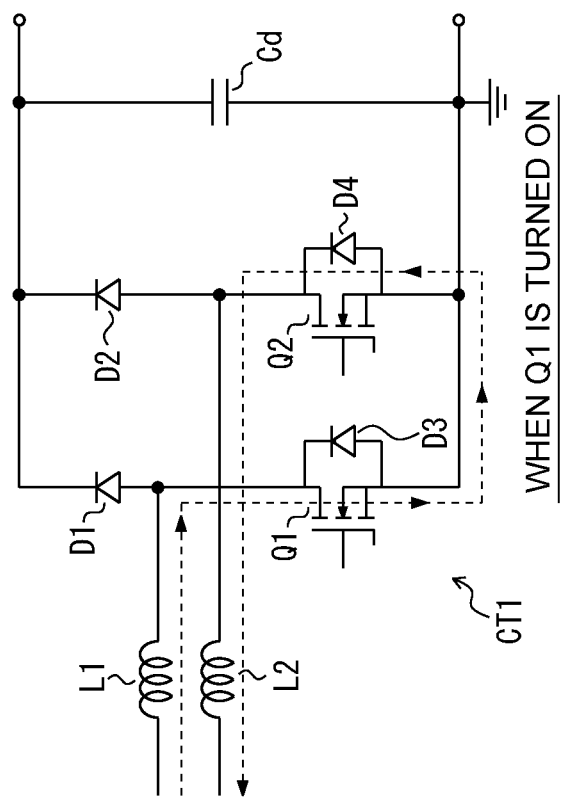

FIG. 2B is a diagram illustrating directions of currents flowing in the power converter 1 by arrow lines in a case where the low-side semiconductor element Q1 is turned on and in a case where the low-side semiconductor element Q1 is turned off. A circuit CT1 of FIG. 2B illustrates a current path in a case where the low-side semiconductor element Q1 in the power converter 1 of FIG. 2A is turned on. In this case, the current flows in the first inductor L1, the low-side semiconductor element Q1, a diode D4 connected in parallel with a low-side transistor Q2, and the second inductor L2 in this order. A circuit CT2 of FIG. 2B illustrates a current path in a case where the low-side semiconductor element Q1 is turned off. In this case, the current flows in the first inductor L1, the high-side semiconductor element D1, the capacitor Cd, the diode D4 connected in parallel with the low-side semiconductor element Q2, and the second inductor L2 in this order.

Figure 2C:
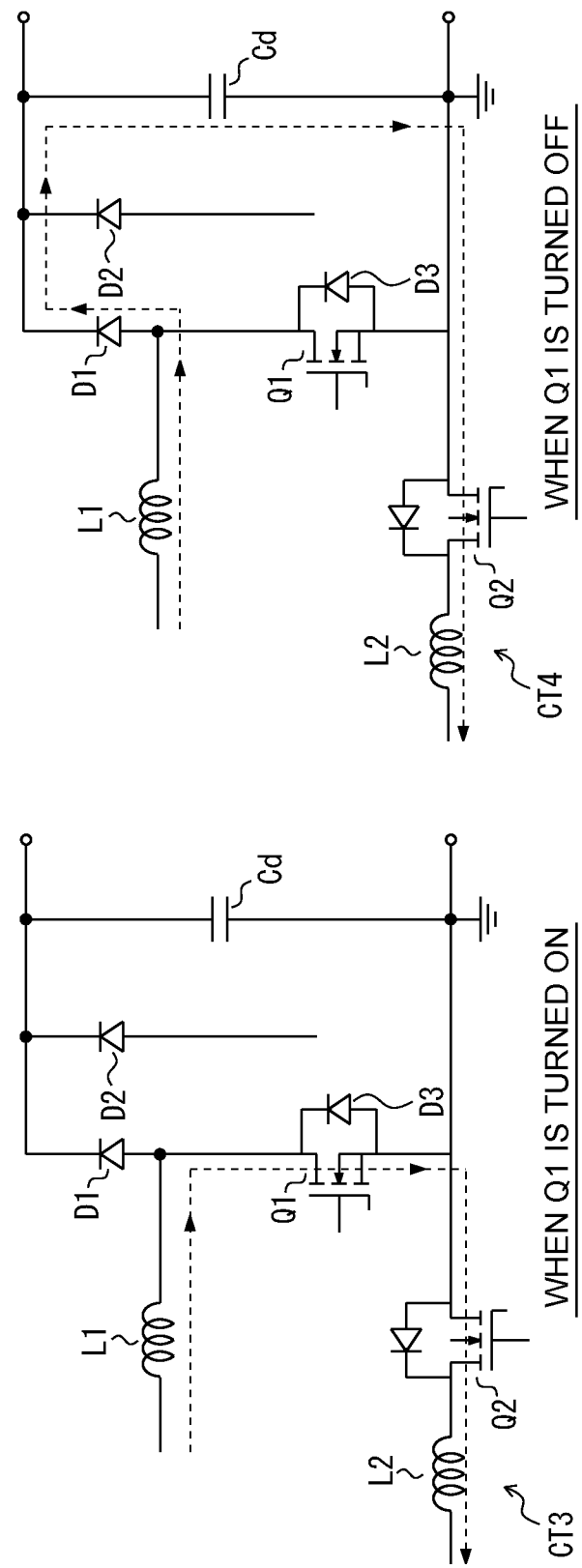
FIG. 2C is a circuit diagram in which the circuit of FIG. 2B is partially changed.

The circuit CT1 of FIG. 2B is substantially equivalent to a circuit CT3 of FIG. 2C. The circuit CT3 is a circuit diagram in which a part of the circuit CT1 is changed without changing a circuit operation, and a connection position of the low-side semiconductor element Q2 and the second inductor L2 is changed.

Similarly, the circuit CT2 of FIG. 2B is substantially equivalent to a circuit CT4 of FIG. 2C. The circuit CT4 is a circuit diagram in which a part of the circuit CT2 is changed without changing a circuit operation, and a connection position of the low-side semiconductor element Q2 and the second inductor L2 is changed.

Figure 2D:
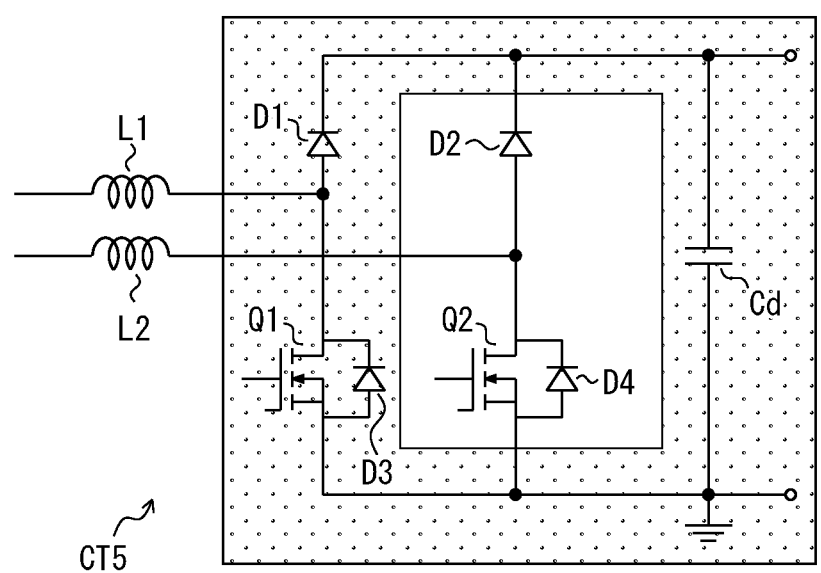
FIG. 2D is a diagram illustrating a current path when an operation of a semiconductor element of a power converter of FIG. 2A is switched.
Figure 2E:
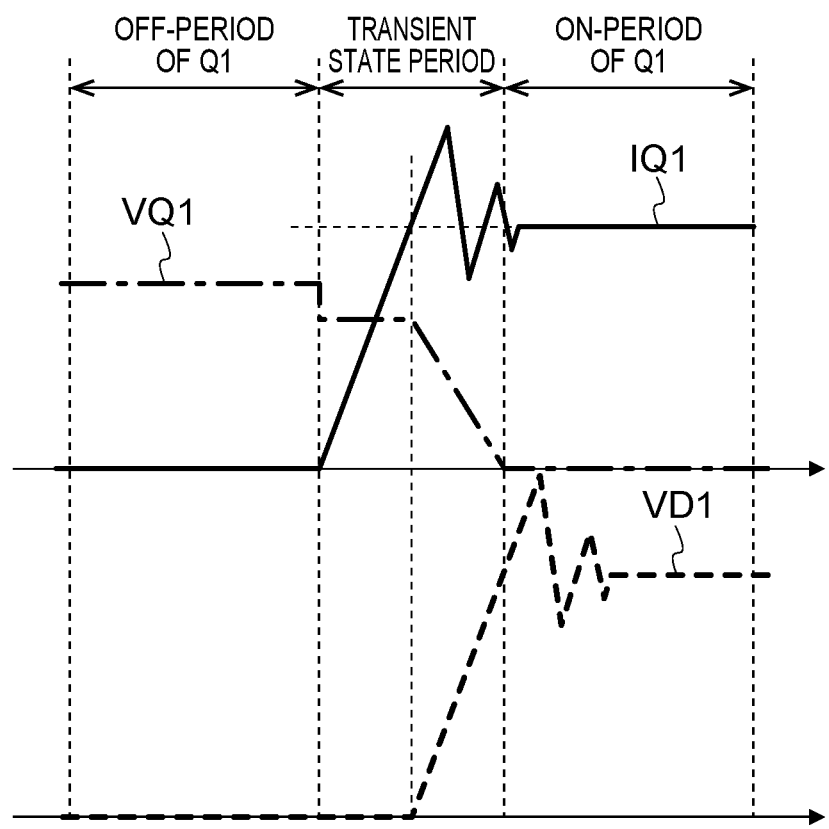
FIG. 2E is a waveform diagram of a transient state period during which a low-side semiconductor element is switched to be turned on and off.

When focusing on the current flow paths of the circuit CT3 and the circuit CT4 in FIG. 2C, in the power converter 1 of FIG. 2A, a loop-shaped current path indicated by a shaded portion of FIG. 2D is formed in a transient state in which the low-side semiconductor element Q1 is switched from on to off or from off to on. In the embodiment, the current path may be referred to as a first current path. In the present specification, a circuit having a loop-shaped current path is referred to as a primary loop circuit 4. FIG. 2E is a diagram illustrating a waveform of each of a voltage VD1 between opposite ends of the high-side semiconductor element (diode) D1, a drain-source voltage VQ1 of the low-side semiconductor element Q1, and a drain current IQ1 of the low-side semiconductor element Q1 in an off-period, an on-period, and a transient state period between the off-period and the on-period of the low-side semiconductor element Q1 in the power converter 1 of FIG. 2A. During the transient state period of FIG. 2E, the current flows along the loop-shaped current path of FIG. 2D, and a surge and ringing occur.

Figure 2F:
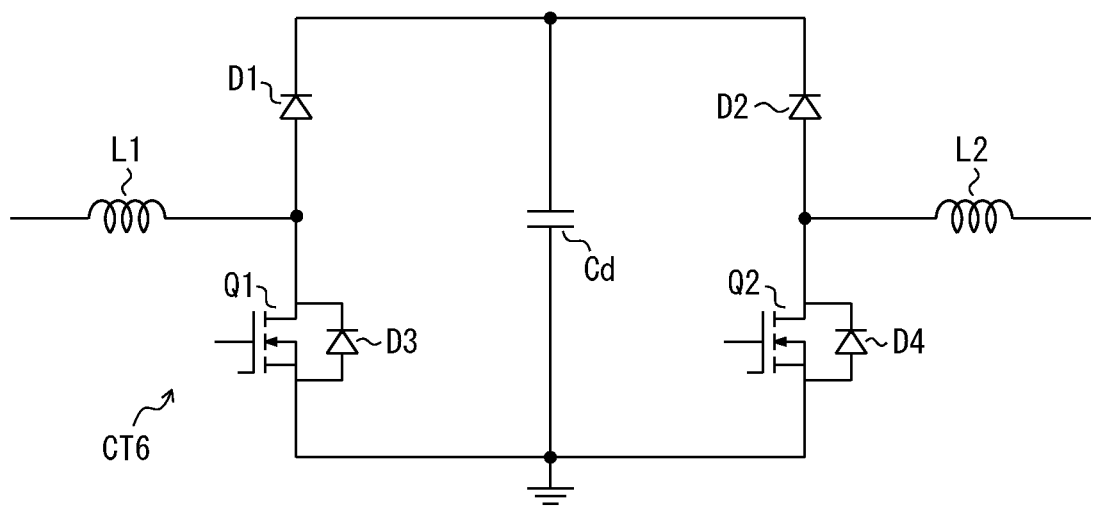
FIG. 2F is a circuit diagram illustrating a circuit equivalent to a circuit of FIG. 2D.

FIG. 2F is a circuit diagram illustrating a circuit CT6 equivalent to a circuit CT5 of FIG. 2D. The circuit CT6 of FIG. 2F is obtained by changing a connection position of the capacitor Cd in the circuit CT5 of FIG. 2D. The low-side semiconductor elements Q1 and Q2 in the circuit CT6 of FIG. 2F are alternately turned on and off, and the current path similar to the current path of FIG. 2D is formed. As described above, even when the low-side semiconductor elements Q1 and Q2 are alternately turned on and off, the current path similar to that of FIG. 2D is formed. Therefore, in the embodiment, analysis by simulation is performed assuming that the power converter 1 includes the primary loop circuit 4 having the current path of FIG. 2D.

Figure 3:
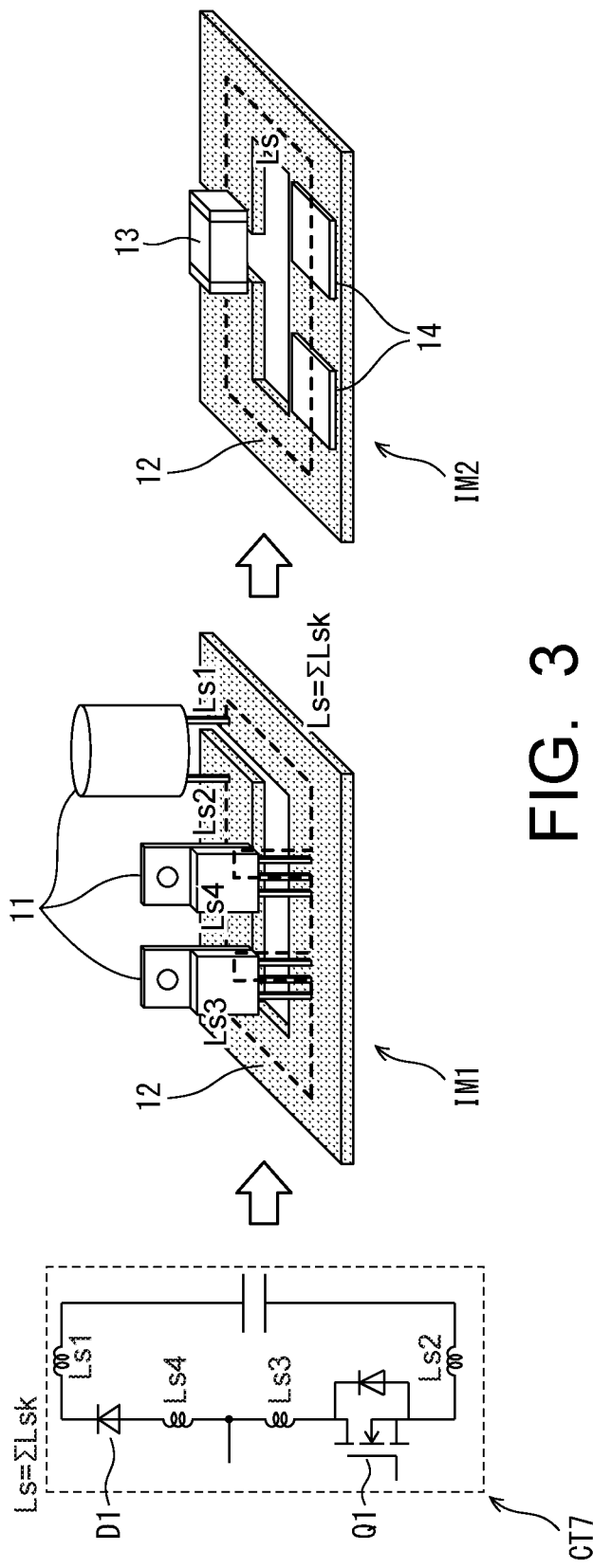
FIG. 3 is a diagram illustrating a feature of a primary loop circuit.

FIG. 3 is a diagram illustrating a feature of the primary loop circuit 4. The circuit CT5 having the current path of FIG. 2D is equivalent to a circuit CT7 illustrated in FIG. 3. The circuit CT7 is a circuit in which the high-side semiconductor element D1, an inductor Ls1, the capacitor Cd, an inductor Ls2, the low-side semiconductor element Q1, an inductor Ls3, and an inductor Ls4 are connected in series. The inductors Ls1 to Ls4 are parasitic inductances formed by terminals of circuit components such as the high-side semiconductor element D1, the low-side semiconductor element Q1, and the capacitor Cd.

When the power converter 1 of FIG. 2A is mounted as a discrete component, for example, a mounting example IM1 of FIG. 3 is obtained. The mounting example IM1 illustrates an example in which individual discrete components 11 are mounted as the high-side semiconductor element D1, the low-side semiconductor element Q1, and the capacitor Cd. In this case, parasitic inductances Ls1 to Ls4 are generated in terminal portions of the mounted discrete components 11. In the mounting example IM1, the current path is simply represented by a loop-shaped conductive pattern 12. A part of the loop-shaped conductive pattern 12 is cut out, and the capacitor Cd is connected between opposite ends of the cut portion. Hereinafter, opposite ends of the loop-shaped conductive pattern 12 are referred to as the first node n1 and the second node n2.

The current path is formed on the conductive pattern 12 extending in a plane direction, whereas the discrete components 11 are disposed in the normal direction from an arrangement surface of the conductive pattern 12. In the normal direction of the loop-shaped conductive pattern 12, a magnetic field corresponding to a direction of the current flowing through the conductive pattern 12 is generated. However, in a case where the discrete components 11 are disposed on the conductive pattern 12, since the discrete components 11 are disposed in the normal direction of the conductive pattern 12, the magnetic field generated in the primary loop circuit 4 is disturbed by the discrete components 11, and the direction of the magnetic field becomes complicated.

Recently, as illustrated in a mounting example IM2 of FIG. 3, a chip component 13 and a surface mounting component 14 are often adopted as the high-side semiconductor element D1, the low-side semiconductor element Q1, and the capacitor Cd. Since the chip component 13 and the surface mounting component 14 have a low height in the normal direction of the mounting surface, a degree in which the direction of the magnetic field generated by the current flowing through the conductive pattern 12 is disturbed by these components is reduced. Therefore, the direction of the magnetic field generated from the primary loop circuit 4 can be regarded as the normal direction of the mounting surface of the primary loop circuit 4 in defiance of an influence of the mounting component.

In the embodiment, when focusing on the fact that the primary loop circuit 4 configuring the power converter 1 generates a magnetic field in the normal direction of the mounting surface, the secondary loop circuit 5 is disposed in the vicinity of the primary loop circuit 4, and the inductance caused by combining the primary loop circuit 4 and the secondary loop circuit 5 is reduced by magnetically coupling the primary loop circuit 4 to the secondary loop circuit 5. As a result, a surge and ringing generated in the primary loop circuit 4 can be suppressed.

Figure 4:
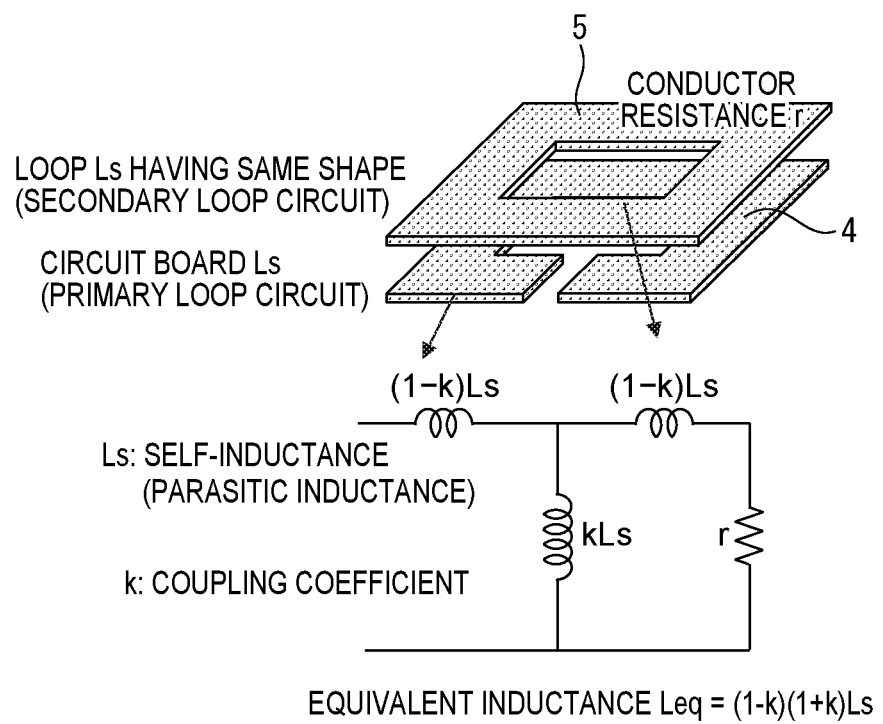
FIG. 4 is a schematic external view in which a secondary loop circuit is disposed in a vicinity of a primary loop circuit and an equivalent circuit diagram.

FIG. 4 shows a schematic external view in which the secondary loop circuit 5 is disposed in the vicinity of the primary loop circuit 4 and an equivalent circuit diagram. In the external view of FIG. 4, the secondary loop circuit 5 is disposed above the primary loop circuit 4, but an arrangement order of the primary loop circuit 4 and the secondary loop circuit 5 is arbitrary. In the equivalent circuit of FIG. 4, self-inductances (parasitic inductances) of the primary loop circuit 4 and the secondary loop circuit 5 are both denoted by Ls, the coupling coefficients of the primary loop circuit 4 and the secondary loop circuit 5 are denoted by k, and a conductor resistance obtained by combining the primary loop circuit 4 and the secondary loop circuit 5 is denoted by r.

As illustrated in FIG. 4, the equivalent circuit of the primary loop circuit 4 and the secondary loop circuit 5 is represented by two inductances $(1-k)Ls$, one inductance $kLs$, and a conductor resistance r. An equivalent inductance Leq obtained by combining the self-inductance of the primary loop circuit 4 and the self-inductance of the secondary loop circuit 5 is $Leq=(1-k)(1+k)Ls$.

A coupling coefficient k is a value larger than 0 and smaller than 1. The coupling coefficient k changes according to the distance between the primary loop circuit 4 and the secondary loop circuit 5, the closer the distance is, the larger the coupling coefficient k becomes, and the equivalent inductance becomes closer to 0. As the equivalent inductance is smaller, a surge and ringing generated in the primary loop circuit 4 can be suppressed.

Figure 5:
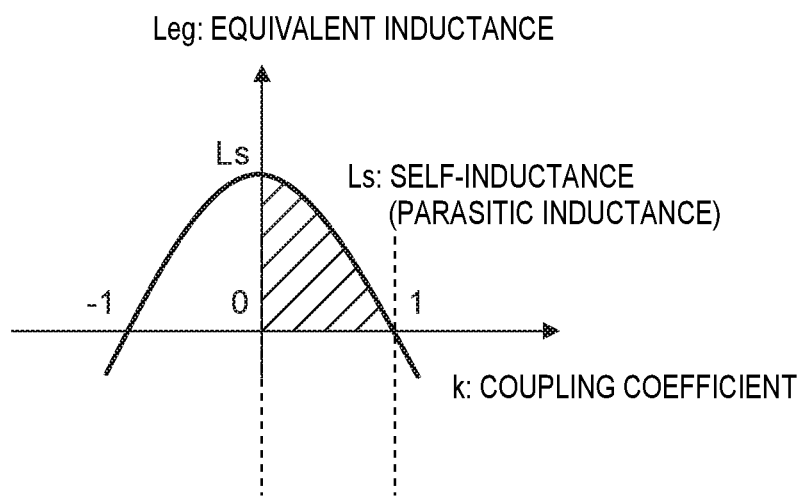
FIG. 5 is a diagram illustrating a correspondence relationship between a coupling coefficient and an equivalent inductance.

FIG. 5 is a diagram illustrating a correspondence relationship between the coupling coefficient k and the equivalent inductance Leq. As illustrated in FIG. 5, the larger the coupling coefficient k, the smaller the equivalent inductance Leq. When k=0, the equivalent inductance is its own inductance. Since the coupling coefficient k can be increased by disposing the secondary loop circuit 5 in the vicinity of the primary loop circuit 4, the equivalent inductance is reduced.

The present inventor verifies how the equivalent inductance changes when the distance between the primary loop circuit 4 and the secondary loop circuit 5 changes, and verifies how the resistance value obtained by combining the primary loop circuit 4 and the secondary loop circuit 5 changes depending on a frequency. These verifications are performed by simulation. The resistance value obtained by combining the primary loop circuit 4 and the secondary loop circuit 5 is a resistance value obtained by adding up the conductor resistance of the primary loop circuit 4, the conductor resistance of the secondary loop circuit 5, and the resistance value of an external resistance element Rex connected to the secondary loop circuit 5.

Figure 6A:
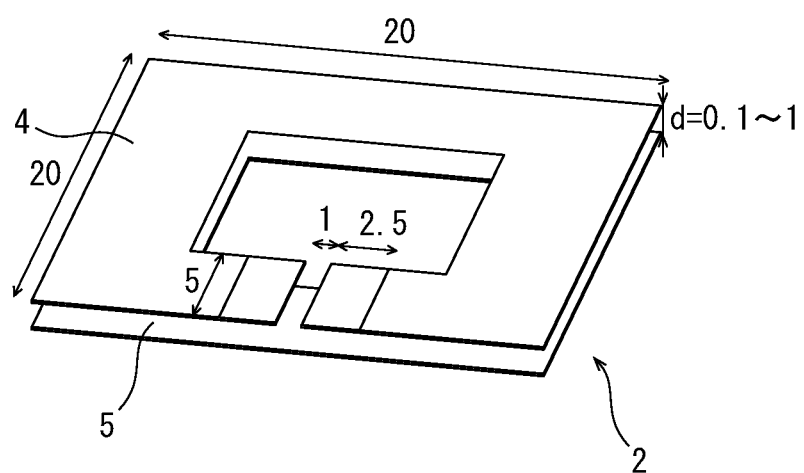
FIG. 6A is an external view of an electronic device used for simulation.

FIG. 6A is an external view of the electronic device 2 used for simulation. The primary loop circuit 4 and the secondary loop circuit 5 have the same size and shape, and are disposed so as to completely and vertically overlap each other at a predetermined distance. As illustrated in FIG. 6A, the primary loop circuit 4 is disposed on the secondary loop circuit 5. Dimensions of electrode portions at opposite ends of the primary loop circuit 4 and the secondary loop circuit 5 are 2.5 mm×5 mm, and external sizes of the primary loop circuit 4 and the secondary loop circuit 5 are 20 mm×20 mm. In the simulation, a distance d between the primary loop circuit 4 and the secondary loop circuit 5 is changed in a plurality of ways within a range of 0.1 mm to 1 mm. In the simulation, the resistance value of the external resistance element Rex connected between opposite ends of the secondary loop circuit 5 is changed in a plurality of ways.

Figure 6B:
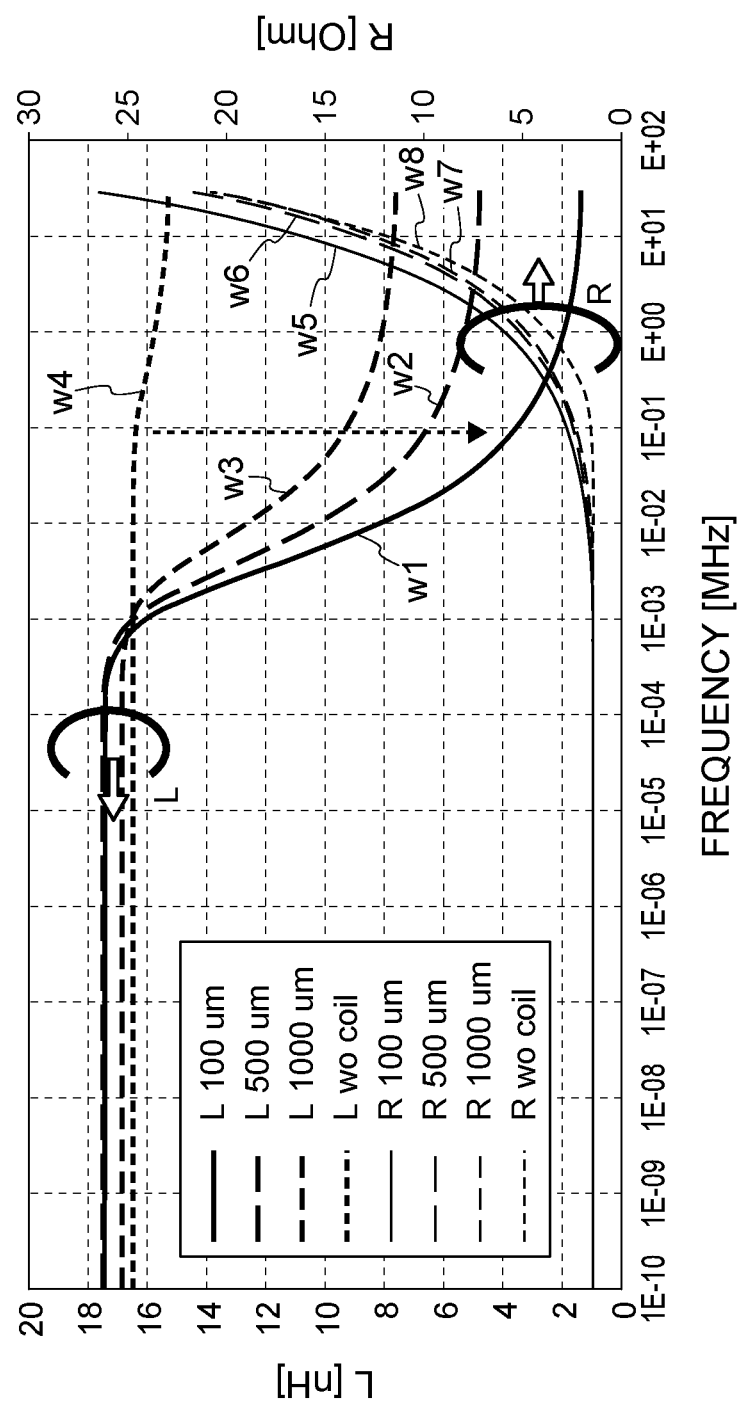
FIG. 6B is a graph illustrating a result of the simulation performed by using the electronic device of FIG. 6A.

FIG. 6B is a graph illustrating a result of the simulation performed by using the electronic device 2 of FIG. 6A. FIG. 6B illustrates curves w1 to w4 indicating a relationship between the frequency and an equivalent inductance L when the distance between the primary loop circuit 4 and the secondary loop circuit 5 is changed in a plurality of ways, and curves w5 to w8 indicating a relationship between the frequency and a resistance value R obtained by combining the primary loop circuit 4 and the secondary loop circuit 5. Here, the frequency in FIG. 6B is a frequency at which operations of the high-side semiconductor element D1 and D2 and the low-side semiconductor element Q1 and Q2 are switched. FIG. 6B illustrates a curve obtained in a case where the distance between the primary loop circuit 4 and the secondary loop circuit 5 is 100 μm, 500 μm, or 1000 μm, and a curve obtained in a case where the secondary loop circuit 5 is not provided (denoted by wo coil).

As illustrated in FIG. 6B, the smaller the distance between the primary loop circuit 4 and the secondary loop circuit 5, the smaller the equivalent inductance L. Furthermore, due to a skin effect, as the frequency increases, the resistance value R obtained by combining the primary loop circuit 4 and the secondary loop circuit 5 increases. As can be seen from the curves w1 to w4 in FIG. 6B, as the distance between the primary loop circuit 4 and the secondary loop circuit 5 is reduced, the equivalent inductance L can be reduced. Therefore, the surge and ringing can be further suppressed. As indicated by the curves w5 to w8 in FIG. 6B, since the current flows only on a conductor surface due to the skin effect, the resistance value R increases as the frequency increases.

Figure 7:
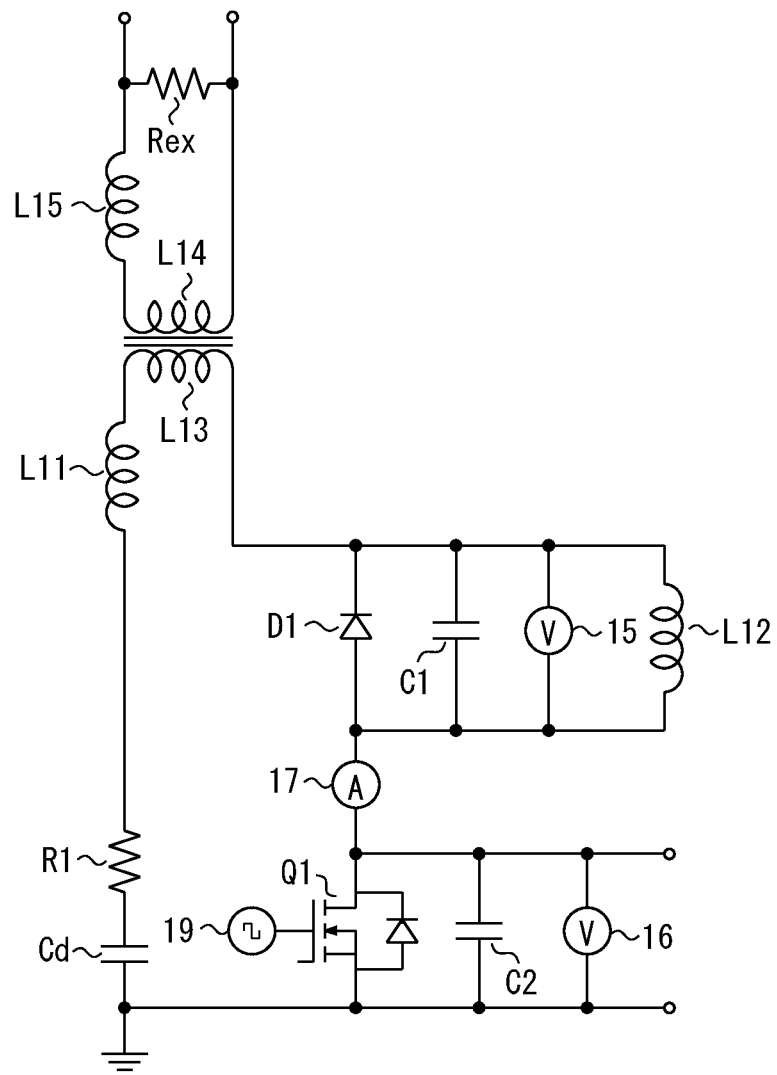
FIG. 7 is a circuit diagram of a power converter, which is input to a circuit simulator.

Next, the present inventor verifies a surge and ringing caused in a case where an external resistance element Rex of 1 ohm or 9 ohm is connected between opposite ends of the secondary loop circuit 5 with a coupling coefficient k of 0.75 by a circuit simulator (PSIM). FIG. 7 is a circuit diagram of the power converter 1, which is input to the circuit simulator.

The power converter 1 of FIG. 7 includes the primary loop circuit 4 and the secondary loop circuit 5. The primary loop circuit 4 includes the diode D1 that is the high-side semiconductor element, the transistor Q1 that is the low-side semiconductor element, the capacitor Cd (DC voltage source), voltmeters 15 and 16, an ammeter 17, an AC voltage source 19, a resistance element R1, a load inductor L12, and a plurality of inductors L11 and L13. A plurality of the inductors L11 and L13 are self-inductances of the primary loop circuit 4, which appears at terminals of the circuit components. More specifically, the inductor L13 is an inductance used for magnetic coupling with the secondary loop circuit 5, and the inductor L11 is a parasitic inductance not used for coupling. The secondary loop circuit 5 includes a plurality of inductors L14 and L15 and the external resistance element Rex connected between the opposite ends of the secondary loop circuit 5. More specifically, the inductor L14 is an inductance used for magnetic coupling with the primary loop circuit 4, and the inductor L15 is a parasitic inductance not used for coupling.

Figure 8A:
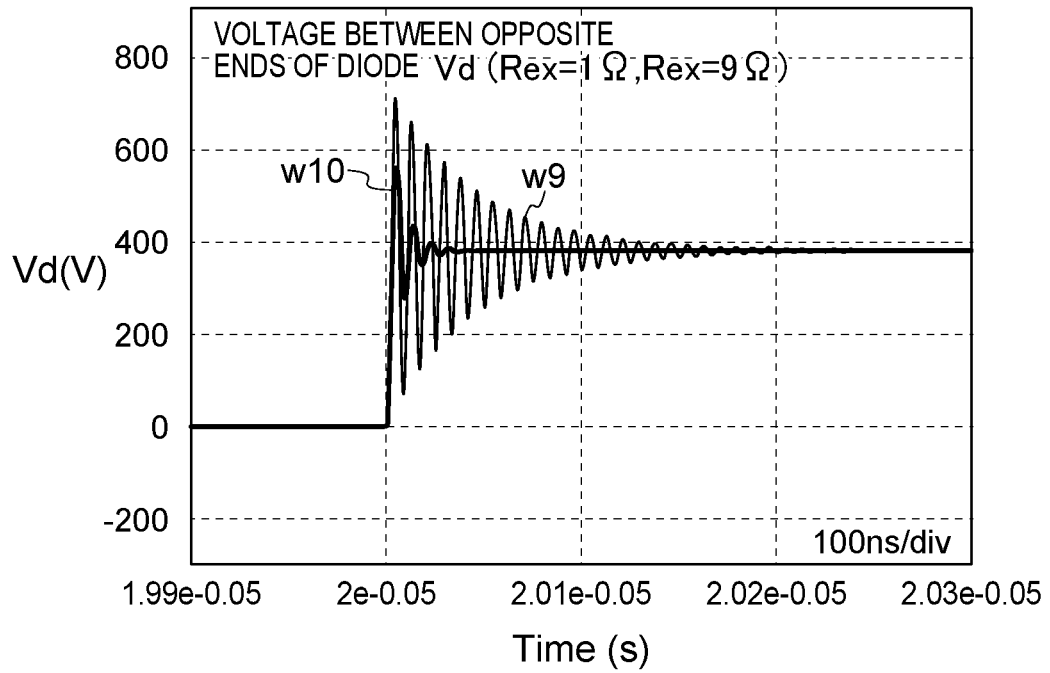
FIG. 8A is a graph of a voltage waveform between opposite ends of a diode when a current does not flow in the diode.

FIG. 8A is a graph of a voltage waveform between opposite ends of the diode D1 when the operation of the diode D1, which is the high-side semiconductor element of FIG. 7, is switched and the current does not flow in the diode D1. The voltage waveform is measured by the voltmeter 15 of FIG. 7. A thin line waveform w9 of FIG. 8A indicates a voltage waveform when the external resistance element Rex=1 ohm, and a thick line waveform w10 indicates a voltage waveform when the external resistance element Rex=9 ohm. As illustrated in FIG. 8A, it can be seen that a surge voltage can be further suppressed and ringing can be further suppressed as the resistance value of the external resistance element Rex is larger.

Figure 8B:
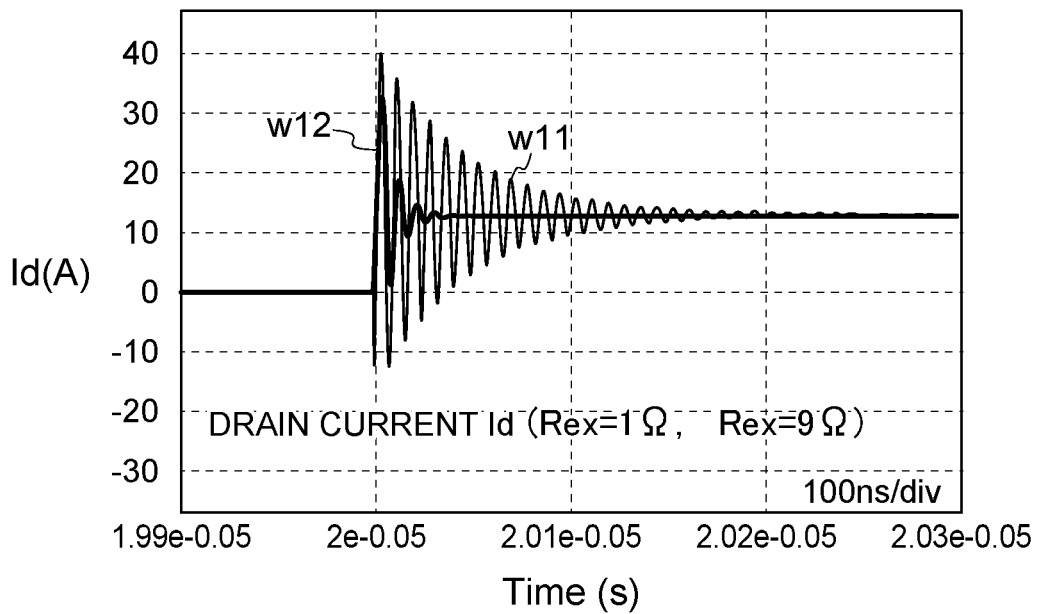

FIG. 8B is a graph of a drain current waveform of the transistor Q1 when the current does not flow in the diode D1 which is the high-side semiconductor element, that is, when the transistor Q1 which is the low-side semiconductor element is turned on. The current waveform is measured by the ammeter 17 of FIG. 7. A thin line waveform w11 of FIG. 8B indicates a current waveform when the external resistance element Rex=1 ohm, and a thick line waveform w12 indicates a current waveform when the external resistance element Rex=9 ohm. The larger the resistance value of the external resistance element Rex, the smaller the surge and ringing of the drain current.

Figure 9A:
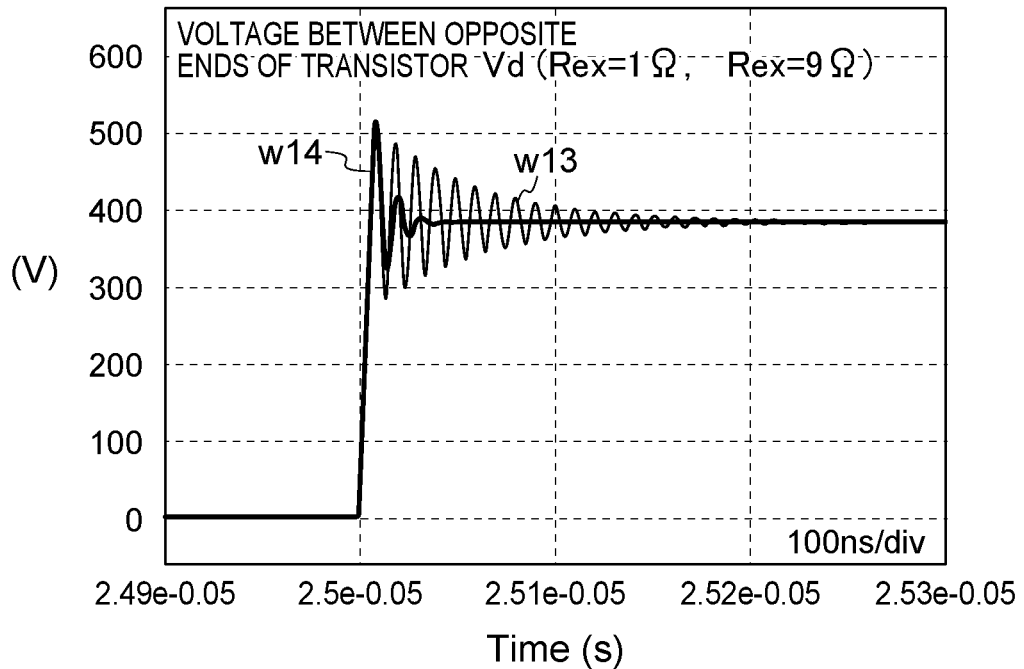
FIG. 9A is a graph of a voltage waveform of a drain-source voltage when a low-side semiconductor element of FIG. 7 is turned off.

FIG. 9A is a graph of a voltage waveform of the drain-source voltage when the transistor Q1 which is the low-side semiconductor element of FIG. 7 is turned off. A thin line waveform w13 of FIG. 9A indicates a voltage waveform when the external resistance element Rex=1 ohm, and a thick line waveform w14 indicates a voltage waveform when the external resistance element Rex=9 ohm. The surge voltage hardly changes even when the external resistance element Rex is changed, but the ringing is smaller as the resistance value of the external resistance element Rex is larger.

Figure 9B:
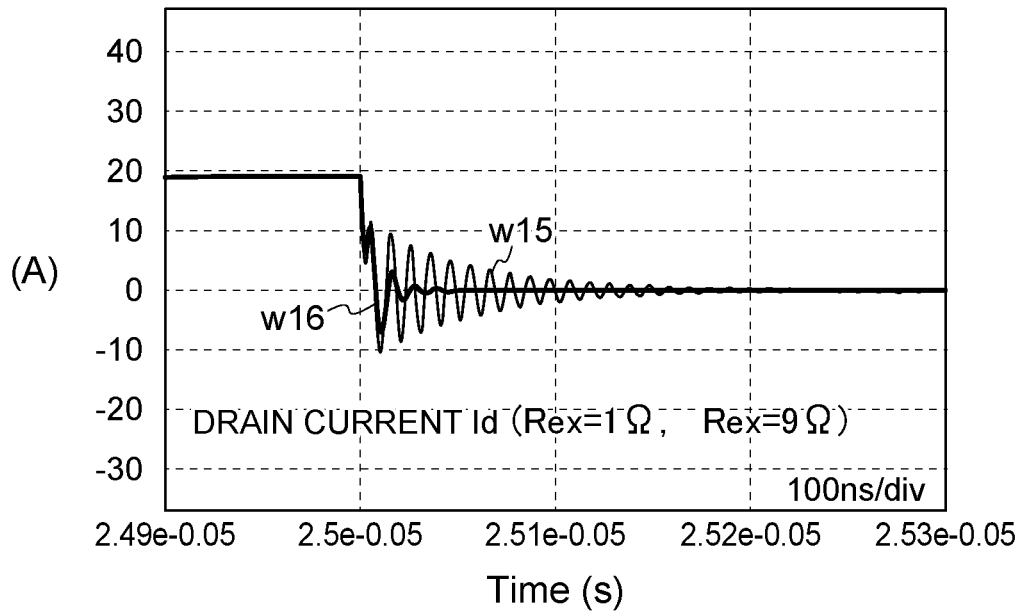
FIG. 9B is a graph of a drain current waveform of a transistor when a low-side semiconductor element of FIG. 7 is turned off.

FIG. 9B is a graph of the drain current waveform of the transistor Q1 when the transistor Q1, which is the low-side semiconductor element of FIG. 7, is turned off. A thin line waveform w15 of FIG. 9B indicates a current waveform when the external resistance element Rex=1 ohm, and a thick line waveform w16 indicates a current waveform when the external resistance element Rex=9 ohm. A surge current hardly changes even when the external resistance element Rex is changed, but the ringing is smaller as the resistance value of the external resistance element Rex is larger.

As can be seen from each of the waveforms of FIGS. 8A, 8B, 9A, and 9B, by adjusting the resistance value of the external resistance element Rex, the surges and ringings of the voltage between opposite ends of the diode D1, which is the high-side semiconductor element, and the drain current of the transistor Q1, which is the low-side semiconductor element, can be suppressed.

Next, the present inventor verifies, by simulation, how the entire impedance in terms of the primary loop circuit 4 changes when the resistance value obtained by combining the primary loop circuit 4 and the secondary loop circuit 5 is changed in a plurality of ways. The resistance value is a value obtained by adding up the conductor resistance of the primary loop circuit 4, the conductor resistance of the secondary loop circuit 5, and the resistance value of the external resistance element Rex connected to the secondary loop circuit 5.

Figure 10:
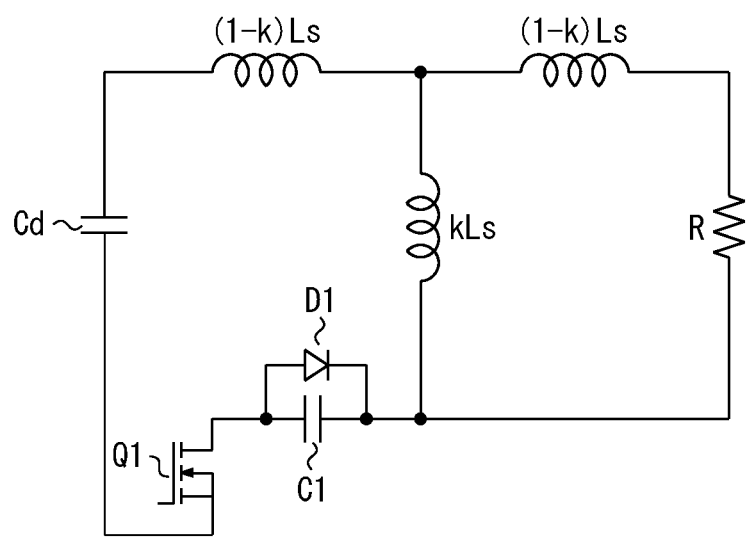
FIG. 10 is an equivalent circuit diagram used for verification.

FIG. 10 is an equivalent circuit diagram used for verification, and includes two inductances $(1-k)Ls$, one inductance $kLs$, the resistance value R, the capacitor Cd (DC voltage source), the diode D1 which is the high-side semiconductor element, a capacitor C1 connected in parallel to the diode D1, and the transistor Q1 which is the low-side semiconductor element, in the similar manner to the equivalent circuit illustrated in FIG. 7 or 4. A switching frequency at which the transistor Q1 is turned on or off is changed in a plurality of ways to examine the frequency at which the impedance becomes minimum. Ls is a self-inductance.

By solving the equivalent circuit of FIG. 10, frequency characteristics of the entire impedance Z in terms of the primary loop circuit 4 can be predicted. The entire impedance Z in terms of the primary loop circuit 4 can be represented by Equation (1) below.

$$Z = \frac{V}{I} = \frac{s^3(2L_M L_x + L_x^2)C_1 + s^2(L_M + L_x)C_1 R + s(L_M + L_x) + R}{s^2(L_M + L_x)C_1 + sC_1 R} \quad (1)$$

In Equation (1), Lx=(1−k)Ls and LM=kLs.

Figure 11:
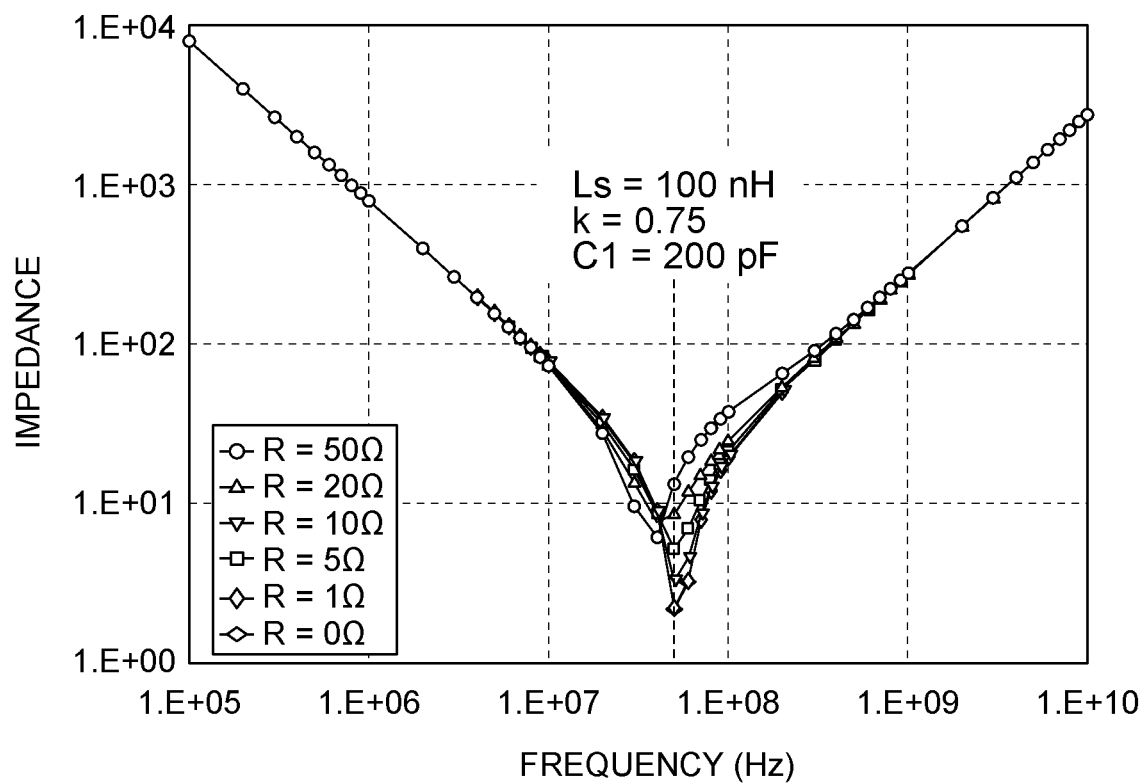
FIG. 11 is a graph illustrating frequency characteristics of an impedance.
Figure 12A:
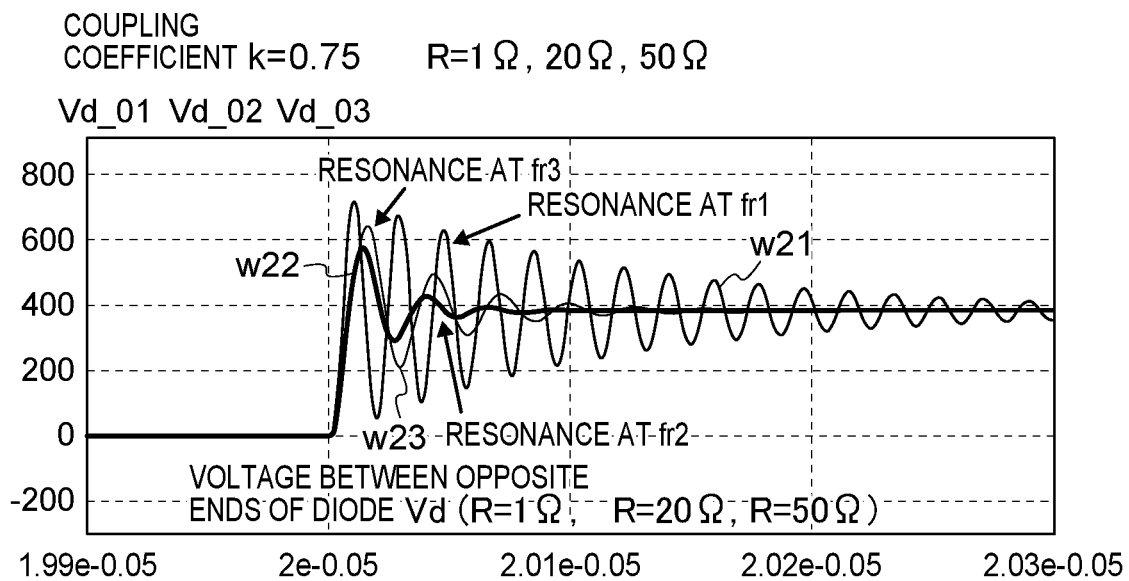
FIG. 12A is a graph illustrating a voltage waveform between opposite ends of a diode that is a high-side semiconductor element.
Figure 12B:
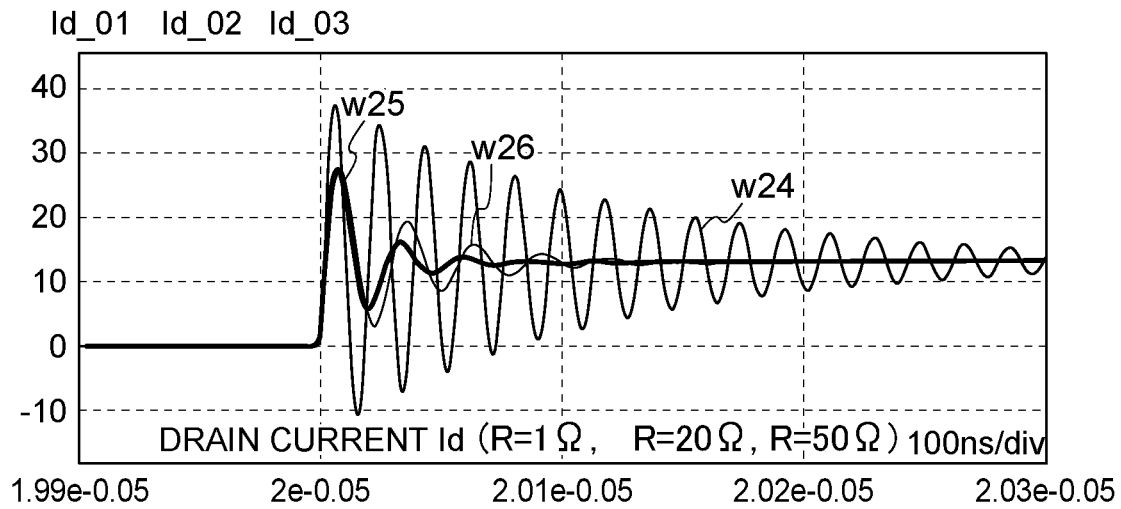
FIG. 12B is a graph illustrating a drain current waveform of a low-side semiconductor element.

FIGS. 11, 12A, and 12B are graphs illustrating a waveform as a result of simulation performed, in the circuit of FIG. 10, with the self-inductance Ls=100 nH, the coupling coefficient k=0.75, and the capacitor C1=200 pF.

FIG. 11 is a graph illustrating frequency characteristics of an impedance calculated based on Equation (1). More specifically, FIG. 11 is a graph illustrating a waveform indicating the relationship between the switching frequency of the transistor Q1 and the entire impedance in terms of the primary loop circuit 4 in a case where the resistance value obtained by combining the primary loop circuit 4 and the secondary loop circuit 5 is changed in a plurality of ways. A surge voltage and ringing occur at a frequency at which the impedance becomes minimum. The minimum value of the impedance tends to decrease as the resistance value decreases, but a result is obtained that a magnitude relationship of the minimum value of the impedance is reversed depending on the resistance value, for example, the minimum value of the impedance is smaller at the resistance value of 20 ohms than at the resistance value R of 50 ohms.

FIG. 12A is a graph illustrating voltage waveforms w21 to w23 between opposite ends of the diode D1, which is the high-side semiconductor element, when the resistance value R is 1 ohm, 20 ohm, and 50 ohm. FIG. 12B is a graph illustrating drain current waveforms w24 to w26 of the transistor Q1, which is the low-side semiconductor element, when the resistance value R is 1 ohm, 20 ohm, and 50 ohm.

As can be seen from FIGS. 12A and 12B, when the resistance value R is 1 ohm, the surge and ringing of the voltage between opposite ends of the diode and the surge and ringing of the drain current of the transistor Q1 are maximized. Furthermore, the surge and ringing of the voltage between opposite ends of the diode and the surge and ringing of the drain current of the transistor Q1 are smaller at the resistance value R of 20 that at the resistance value R of 50. As described above, it is found that the surge and ringing are not necessarily smaller as the resistance value increases.

Figure 13:
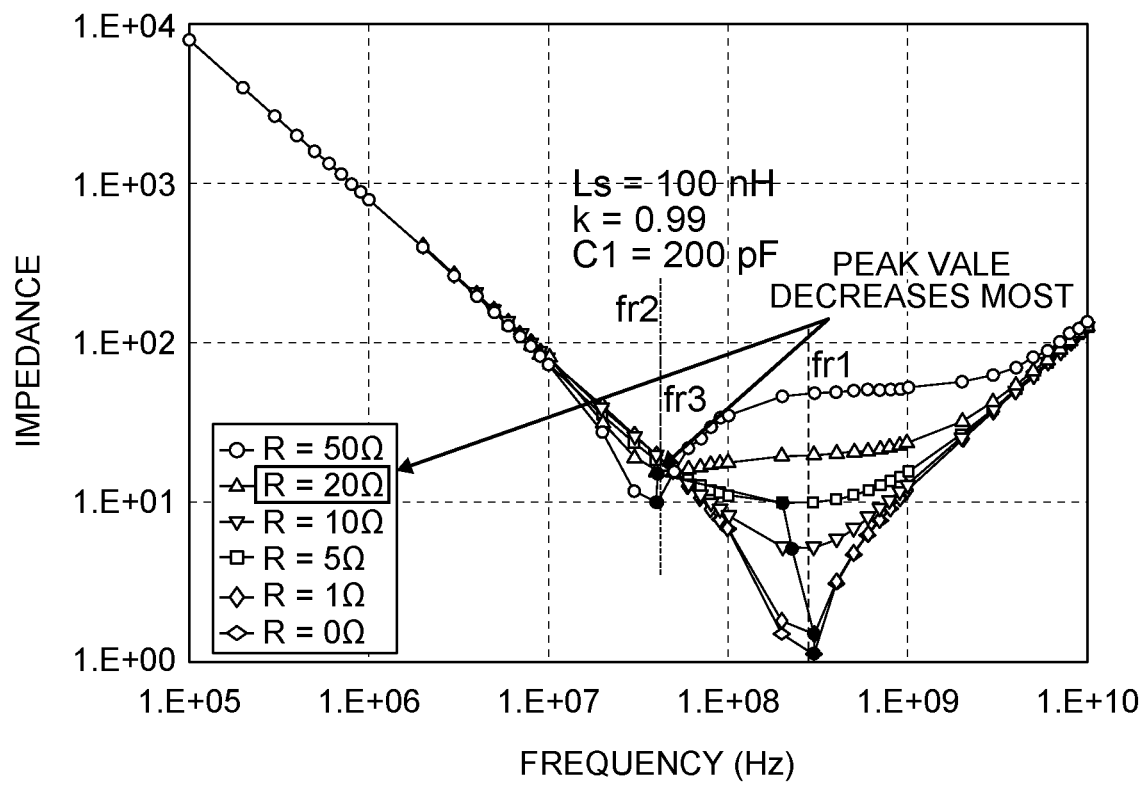
FIG. 13 is a waveform graph illustrating a relationship between a switching frequency of a transistor and an entire impedance in terms of a primary loop circuit.
Figure 14A:
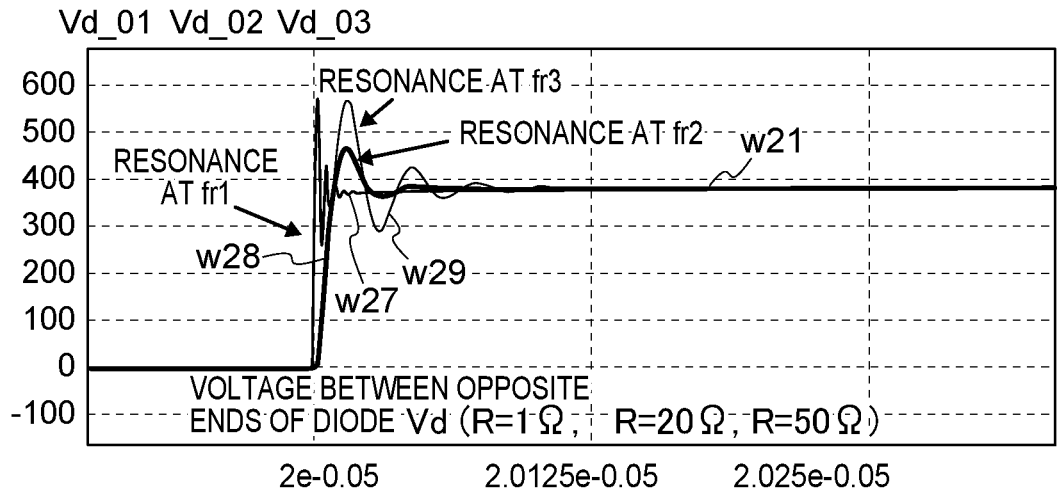
FIG. 14A is a graph illustrating a voltage waveform between opposite ends of a high-side semiconductor element.
Figure 14B:
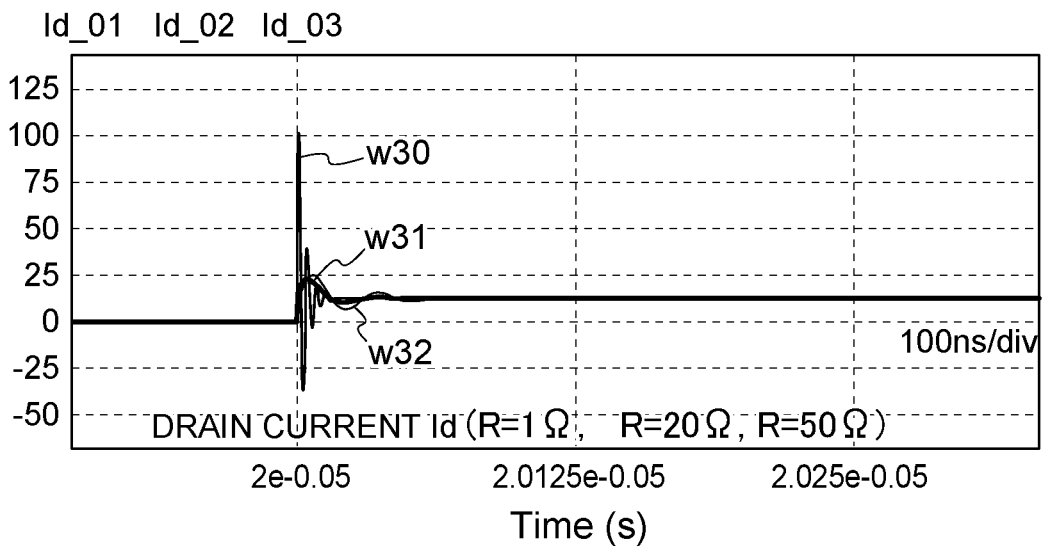
FIG. 14B is a graph illustrating a drain current waveform of a low-side semiconductor element.

FIGS. 13, 14A, and 14B are graphs illustrating a waveform as a result of simulation performed, in the circuit of FIG. 10, with the self-inductance Ls=100 nH, the coupling coefficient k=0.99, and the capacitor C1=200 pF.

FIG. 13 is a graph illustrating the waveform indicating the relationship between the switching frequency of the transistor Q1 and the entire impedance in terms of the primary loop circuit 4 in a case where the resistance value obtained by combining the primary loop circuit 4 and the secondary loop circuit 5 is changed in a plurality of ways. Similarly to FIG. 11, the minimum value of the impedance exists for any resistance value. As the resistance value R is smaller, the minimum value of the impedance tends to be smaller, but at some resistance values R, the magnitude relationship of the minimum value of the impedance is reversed.

FIG. 14A is a graph illustrating voltage waveforms w27 to w29 between opposite ends of the diode D1, which is the high-side semiconductor element, when the resistance value R is 1 ohm, 20 ohm, and 50 ohm. FIG. 14B is a graph illustrating drain current waveforms w30 to w32 of the transistor Q1, which is the low-side semiconductor element, when the resistance value R is 1 ohm, 20 ohm, and 50 ohm.

Similarly to FIGS. 12A and 12B, in FIGS. 14A and 14B, when the resistance value R is 1 ohm, the surge of the voltage between opposite ends of the diode and the surge of the drain current of the transistor Q1 are maximized. However, when the resistance value R is 1 ohm, since a frequency fr1 at which the impedance becomes minimum is higher than a frequency fr2 and a frequency fr3, the ringing occurs in the shortest time. When the resistance value R is 20 ohms, the surge and ringing are smaller than those when resistance value R is 50 ohms.

As illustrated in FIGS. 11, 12A, 12B, 13, 14A, and 14B described above, by adjusting the resistance value obtained by combining the primary loop circuit 4 and the secondary loop circuit 5, it is possible to control the entire impedance in terms of the primary loop circuit 4, the magnitude of the surge and ringing of the voltage between opposite ends of the high-side semiconductor element or the low-side semiconductor element, and the magnitude of the surge and ringing of the drain current of the high-side semiconductor element or the low-side semiconductor element. The resistance value obtained by combining the primary loop circuit 4 and the secondary loop circuit 5 is a resistance value obtained by adding up the conductor resistance of the primary loop circuit 4, the conductor resistance of the secondary loop circuit 5, and the resistance value of the external resistance element Rex connected to the secondary loop circuit 5. Among these resistance values, a resistance value that can be easily adjusted is a resistance value of the external resistance element Rex. Therefore, the external resistance element Rex is desirably disposed at a position in which the resistance value can be easily adjusted.

Figure 15:
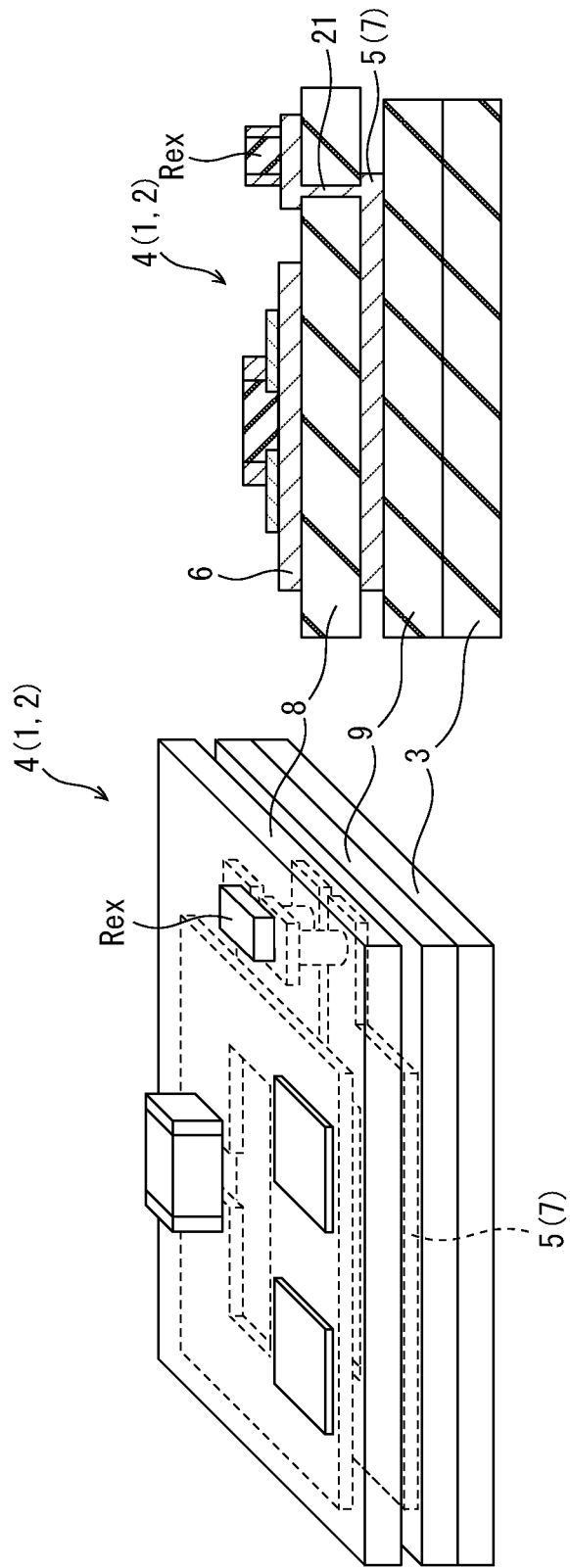
FIG. 15 is a cross-sectional view illustrating an example in which an external resistance element is disposed on an outermost surface layer in which a primary loop circuit is formed.

FIG. 15 is a cross-sectional view illustrating an example in which the external resistance element Rex is disposed on the outermost surface layer (first layer 6) in which the primary loop circuit 4 is formed. In FIG. 15, the second layer 7 having the secondary loop circuit 5 is formed on the second insulation layer 9 disposed on the base substrate 3, and the first layer 6 having the primary loop circuit 4 is formed on the first insulation layer 8 disposed on the second layer 7. Contacts 21 (first contacts) extending upward from opposite ends of the secondary loop circuit 5 are disposed, and the contacts 21 are connected to the external resistance element Rex disposed on the first insulation layer 8. More specifically, the secondary loop circuit 5, in which a part of the current path is cut out, is disposed so as to surround a part of a region on the second layer 7 from a first end portion to a second end portion of the current path, and opposite ends of the resistance element are connected to the first end portion and the second end portion via separate contacts 21.

In the case of FIG. 15, since the external resistance element Rex is disposed on the outermost first layer 6, replacement is easily performed. Therefore, it is possible to perform, by trial and error, an operation of examining the optimum resistance value at which the surge voltage, the surge current, and the ringing, which are caused when the entire impedance in terms of the primary loop circuit 4 is minimized, are minimized by changing the resistance value of the external resistance element Rex in a plurality of ways.

The secondary loop circuit 5 according to the embodiment functions as a loop antenna. The loop antenna is easily affected by a surrounding magnetic field other than the primary loop circuit 4. Therefore, the shield layer may be disposed on a surface of the secondary loop circuit 5, the surface being opposite to the surface facing the primary loop circuit 4.

Figure 16:
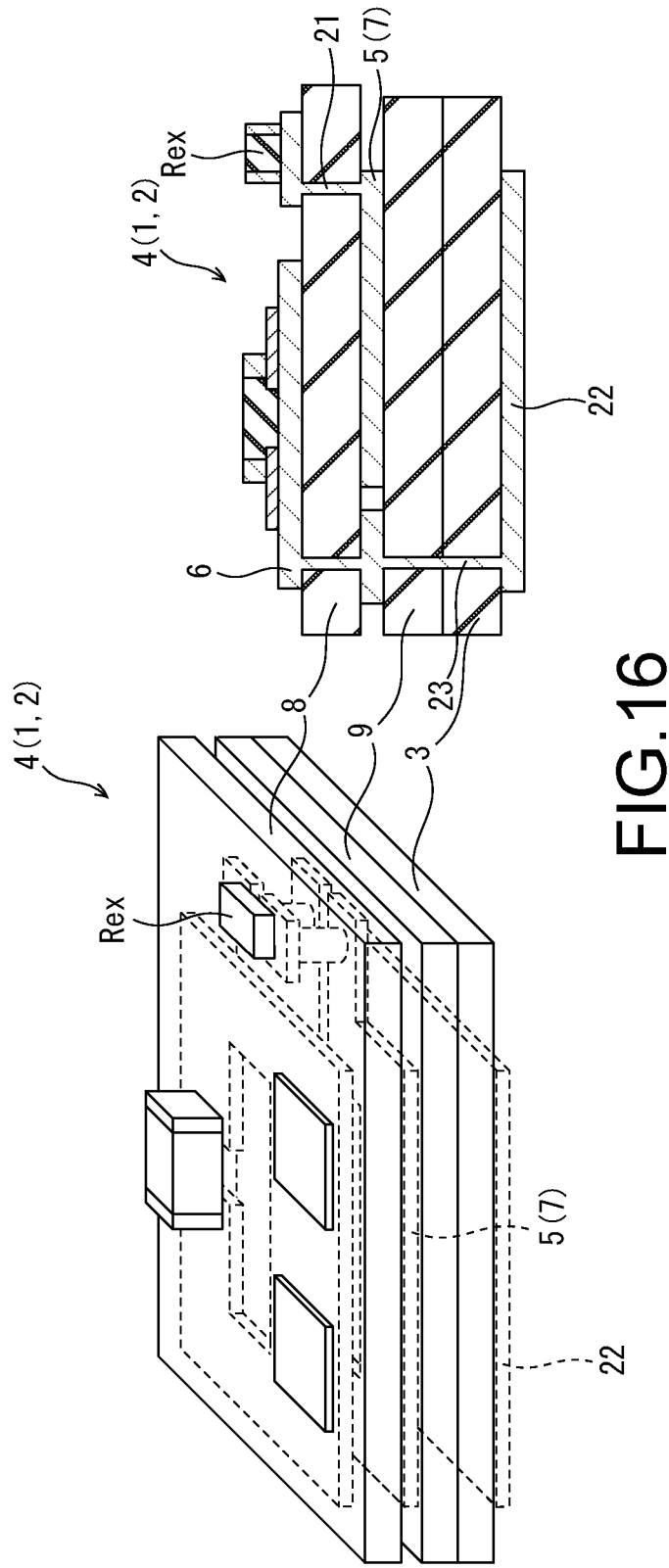
FIG. 16 is a cross-sectional view in which a shield layer is added to a configuration of FIG. 15.

FIG. 16 is a cross-sectional view in which the shield layer 22 (third layer) is added to the configuration of FIG. 15. In FIG. 16, the shield layer 22 is disposed on a surface of the base substrate 3, the surface being opposite to a contact surface with the first insulation layer 8. The shield layer 22 has a solid conductive pattern. Contacts 23 (second contact, and third contact) extend upward from the shield layer 22, and the contacts 23 are connected to the secondary loop circuit 5 and the primary loop circuit 4. In a more specific example, the contacts 23 extending upward from the shield layer 22 are connected to a grounding portion of the secondary loop circuit 5 and a grounding portion of the primary loop circuit 4. According to this, it is possible to suppress a potential fluctuation of a ground level of the primary loop circuit 4 and the secondary loop circuit 5.

In FIG. 16, the shield layer 22 is disposed on a surface of the base substrate 3, the surface being opposite to a contact surface with the first insulation layer 8, but the shield layer 22 may be disposed between the base substrate 3 and the first insulation layer 8. For example, in a case where the base substrate 3 is a multilayer substrate having a plurality of inner layers, any of the inner layers may be used as the shield layer 22.

The shield layer 22 may be brought into contact with a heat sink (not illustrated) or the like. Accordingly, it is possible to dissipate heat from the electronic device 2 and to suppress fluctuation of a ground potential.

As described above, in the embodiment, since the secondary loop circuit 5 is disposed close to the primary loop circuit 4, the equivalent inductance caused by combining the primary loop circuit 4 and the secondary loop circuit 5 can be reduced by magnetically coupling the primary loop circuit 4 to the secondary loop circuit 5, and the surge and ringing that occur in the primary loop circuit 4 can be suppressed.

Furthermore, by adjusting the resistance value obtained by combining the primary loop circuit 4 and the secondary loop circuit 5, it is possible to select an optimum resistance value that minimizes surge and ringing that occur in the primary loop circuit 4.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An electronic device comprising:
a primary loop circuit that comprises a main circuit causing a current to flow in a loop shape;
a secondary loop circuit that is disposed to face the primary loop circuit at a predetermined distance, and causes an induced current generated by a magnetic field generated in the primary loop circuit to flow in a loop shape;
a first layer in which the primary loop circuit is disposed; and
a second layer that is stacked above or below the first layer at the predetermined distance, and in which the secondary loop circuit is disposed,
wherein the secondary loop circuit is disposed so as to surround a part of a region on the second layer from a first end portion to a second end portion on the second layer, and
the first end portion and the second end portion are connected to opposite ends of the resistance element via the separate first contacts, respectively.

2. The electronic device according to claim 1, wherein the secondary loop circuit does not comprise an active element but comprises a passive element.

3. The electronic device according to claim 1, wherein the secondary loop circuit has a shape and a size which correspond to a shape and a size of the primary loop circuit.

4. The electronic device according to claim 1, wherein the predetermined distance is a distance within a range in which the primary loop circuit and the secondary loop circuit are magnetically coupled.

5. An electronic device comprising:
a primary loop circuit that comprises a main circuit causing a current to flow in a loop shape;
a secondary loop circuit that is disposed to face the primary loop circuit at a predetermined distance, and causes an induced current generated by a magnetic field generated in the primary loop circuit to flow in a loop shape;
a first layer in which the primary loop circuit is disposed; and
a second layer that is stacked above or below the first layer at the predetermined distance, and in which the secondary loop circuit is disposed,
wherein the primary loop circuit and at least a part of the secondary loop circuit are disposed so as to vertically overlap each other when the first layer and the second layer are viewed in a plan view.

6. The electronic device according to claim 5, wherein each of the first layer and the second layer is disposed on a front surface, a back surface, or an inner layer surface of a base substrate.

7. The electronic device according to claim 1, wherein the primary loop circuit and at least a part of the secondary loop circuit are disposed so as to vertically overlap each other when the first layer and the second layer are viewed in a plan view.

8. The electronic device according to claim 5, further comprising:
first contacts that electrically connect at least a part of the first layer with at least a part of the second layer; and
a resistance element that is disposed on the first layer and electrically connected to the secondary loop circuit via the first contacts.

9. The electronic device according to claim 8, wherein the secondary loop circuit is disposed so as to surround a part of a region on the second layer from a first end portion to a second end portion on the second layer, and
the first end portion and the second end portion are connected to opposite ends of the resistance element via the separate first contacts, respectively.

10. The electronic device according to claim 5, further comprising
a third layer having a solid pattern, the third layer being electrically connected to a part of the second layer.

11. The electronic device according to claim 10, further comprising
a second contact that electrically connects a part of the second layer with the third layer.

12. The electronic device according to claim 10, further comprising
a third contact that electrically connects a part of the first layer with the third layer.

13. The electronic device according to claim 10, wherein the third layer is disposed on a front surface, a back surface, or an inner layer surface of a base substrate.

14. The electronic device according to claim 1, wherein the main circuit comprises a high-side semiconductor element and a low-side semiconductor element that periodically switch a direction of a current flowing in the main circuit.

15. An electronic device comprising:
a primary loop circuit that comprises a main circuit causing a current to flow in a loop shape; and
a secondary loop circuit that is disposed to face the primary loop circuit at a predetermined distance, and causes an induced current generated by a magnetic field generated in the primary loop circuit to flow in a loop shape,
wherein the primary loop circuit comprises
a first current path that periodically changes the direction of the current by periodically switching operations of the high-side semiconductor element and the low-side semiconductor element, and
a capacitor connected on the first current path, and
the secondary loop circuit comprises a second current path through which an induced current corresponding to a magnetic field generated by the current flowing through the first current path flows.

16. The electronic device according to claim 1, wherein a circuit component in the primary loop circuit is at least one of a chip component or a surface mounting component.

17. The electronic device according to claim 1, wherein the main circuit is a power conversion circuit.

18. A power converter comprising:
a primary loop circuit that comprises a main circuit performing power conversion by causing a current to flow in a loop shape; and
a secondary loop circuit that is disposed to face the primary loop circuit at a predetermined distance and causes an induced current generated by a magnetic field generated in the primary loop circuit to flow in a loop shape,
wherein the main circuit comprises a high-side semiconductor element and a low-side semiconductor element that periodically switch a direction of the current flowing in the main circuit,
the primary loop circuit comprises
a first current path that periodically changes the direction of the current by periodically switching operations of the high-side semiconductor element and the low-side semiconductor element, and
a capacitor connected on the first current path, and
the secondary loop circuit comprises a second current path through which an induced current corresponding to a magnetic field generated by the current flowing through the first current path flows.

* * * * *